Jan. 24, 1956 C. R. MANSELL ET AL 2,732,438

TELEPHONE RECEIVER RESTS

Filed Nov. 9, 1953

INVENTOR
Carman R. Mansell
Harold D. Davis

BY Shley & Shley

ATTORNEYS

United States Patent Office 2,732,438
Patented Jan. 24, 1956

2,732,438

TELEPHONE RECEIVER RESTS

Carman R. Mansell and Harold D. Davis, Dallas, Tex., assignors of one-fourth to Lewis F. Petersen and one-fourth to James M. Railey, both of Dallas, Tex.

Application November 9, 1953, Serial No. 390,866

2 Claims. (Cl. 179—146)

Figures 1, 2, 3, 4, 5:
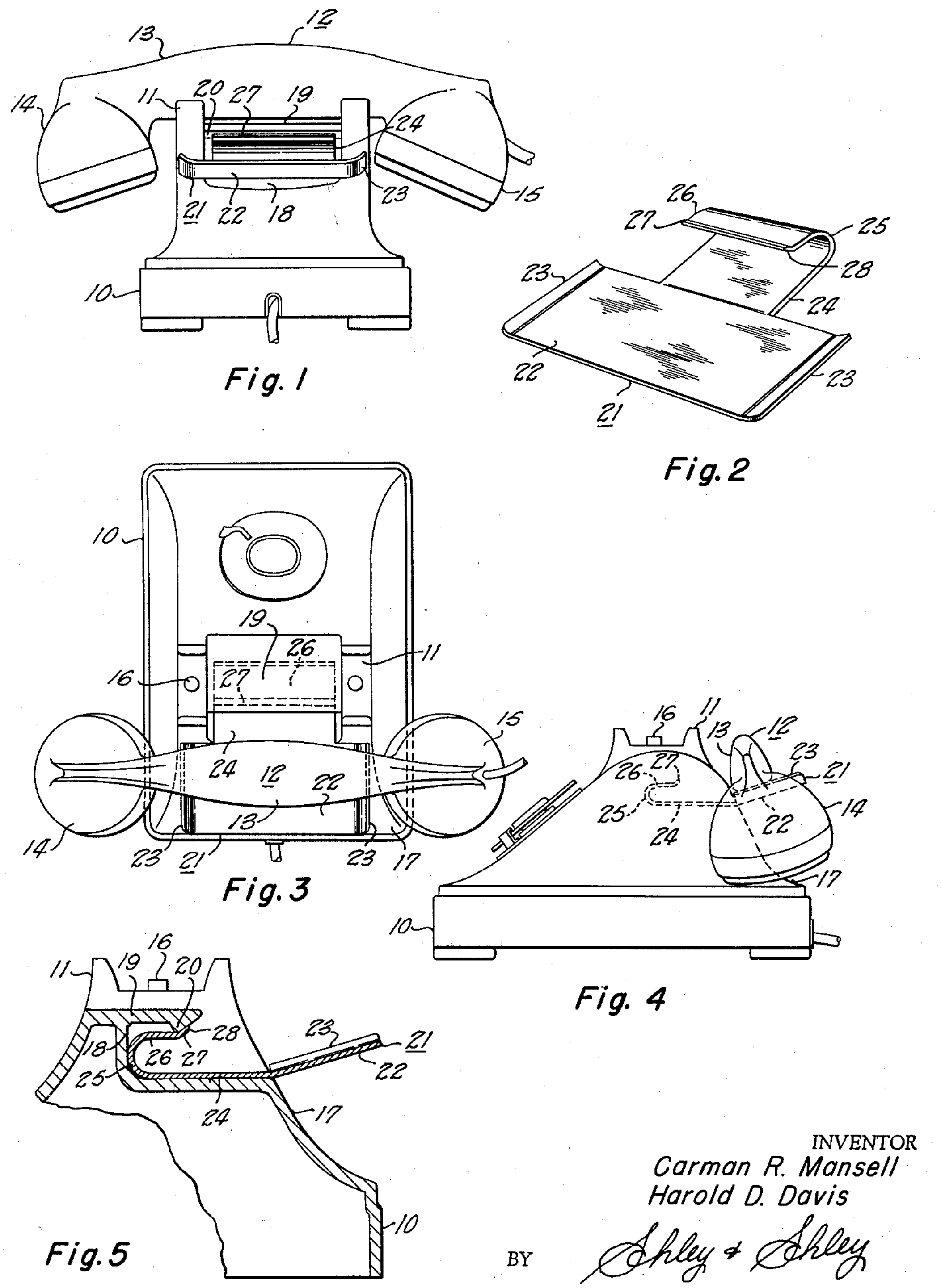

This invention relates to new and useful improvements in rests for telephone receiver-transmitters.

One object of the invention is to provide an improved holder or rest for the receiver-transmitter of a telephone instrument of the desk or hand set type in the form of an inexpensive, simple attachment which may be readily applied to and detached from the instrument.

Another object of the invention is to provide an improved rest for a telephone receiver-transmitter having novel means for conveniently and securely supporting the receiver-transmitter against displacement and immediately adjacent the usual cradle of a telephone instrument so as to substantially eliminate the transmission of noise when said receiver-transmitter is placed on the rest.

A particular object of the invention is to provide an improved telephone receiver-transmitter rest having resilient means, in the nature of a spring clip, for frictionally engaging the hand or finger grip recess of a telephone instrument to support the receiver-transmitter and without interfering with the normal use of said recess in picking up and carrying the instrument.

An important object of the invention is to provide an improved telephone receiver-transmitter holder, of the character described, having a portion of such construction as to rigidly support the receiver-transmitter without wobbling and adapted to coact directly with the instrument.

A construction designed to carry out the invention will be hereinafter described together with other features of the invention.

The invention will be more readily understood from a reading of the following specification and by reference to the drawing, wherein an example of the invention is shown, and wherein:

Fig. 1 is a rear elevational view of a telephone instrument having a receiver-transmitter rest, constructed in accordance with the invention, attached thereto, Fig. 2 is a perspective view of the rest, Fig. 3 is a top plan view of the instrument with its receiver supported by the rest, Fig. 4 is a side elevational view, similar to Fig. 3, and Fig. 5 is a transverse, vertical, sectional view showing the frictional engagement of the rest with the rear recess of the instrument.

In the drawing, the numeral 10 designates the body or housing of a conventional telephone instrument of the desk or hand set type having a cradle 11 for supporting a receiver-transmitter 12, hereinafter referred to as a receiver, which includes a handle 13 with a receiver 14 at one end and a transmitter 15 at the other end. A pair of depressible pins or plungers 16 are carried by the cradle 11 for opening and closing the usual telephone circuit. The housing 10 has a sloping rear wall 17 and a horizontal recess 18 is formed therein immediately below the cradle to provide a horizontal partition or wall 19 therebetween (Fig. 5). A projection or ridge 20 depends from the outer or rear margin of the wall 19 into the recess 18, whereby said wall and its ridge function as a hand or finger grip to permit picking up and carrying of the instrument. It is noted that the described telephone instrument is in common use and forms no part of the present invention.

For supporting the receiver upon the instrument without opening the circuit, a holder or rest 21 is provided in the form of an attachment for coacting engagement with said instrument and particularly its recess 18. The rest 21 is formed of thin metal or other suitable material capable of being formed, having limited flexibility or resiliency, and being substantially T-shaped in plan (Fig. 2). As shown, the transverse portion or head 22 of the rest is relatively flat and has its ends bent slightly upward on a relatively large radius to provide upturned projections or lips 23 which form a substantially dished support or two-point suspension for the receiver. A shank or tongue 24, of reduced width, extends medially and at a right angle from one longitudinal margin of the head 22 in a plane at a slight upward inclination to the plane of said head. As shown by the numeral 25, the free or inner end portion of the tongue 24 is bent or bowed upwardly and then inwardly upon itself to provide a reverse bend or curve of constant, relatively large radius. An overhanging flange 26 in spaced, substantially parallel relation to the tongue is formed by the bend 25 and is directed toward the head 22. Preferably, the outer extremity of the flange 26 is bent upwardly to provide an upturned lip 27 for engaging and conforming to the contour of the ridge 20 of the housing wall 19, and the inner or lower edge portion of the lip may be bevelled as shown by the numeral 28 (Fig. 5).

The tongue 24 and its overlying flange 26 function as an internal spring-clip portion or resilient element for frictional engagement with the recess 18 of the housing 10 to removably attach the rest 21 to the telephone instrument. A dished support or member which substantially conforms to the contour of the receiver handle 13 is provided by the head 22 and its upturned, end lips 23. Although the lengths of the tongue and flange vary in conformity to the depths of the recess and its top wall 19, said tongue and flange are of less width than said recess so as to be spaced from the side walls thereof. As a result, there is no marring of the instrument when the rest is attached thereto by inserting its tongue in the recess, and said rest is retained solely by the frictional engagement of its resilient portion or element with the top and bottom walls of said recess. Since the wall 19 is of less depth or width than the bottom wall of the recess, due to the sloping rear wall 17 of the housing, the flange of the rest is of less thength than the tongue and terminates substantially at the medial portion thereof.

As shown most clearly in Fig. 5, the bend 25 is adapted to abut the end wall of the recess upon attachment of the rest. The flange 26 bears against the wall 19 so as to force the tongue 24 into flat engagement with the bottom wall. When the upturned lip 27 is employed, as is preferable, said lip snugly engages the depending ridge 20 in conformity therewith. It is noted that the resilient portion or element is slightly compressed or contracted upon insertion in the recess and that its resiliency provides adequate frictional engagement to prevent accidental or unintentional displacement of the rest. Of course, downward pivoting of the rest is prevented by the engagement of the flange with the wall 19 or its ridge. In addition, the inner longitudinal margin of the head 22 bears against the sloping rear wall 17 to assist in supporting the rest. When the top wall of the recess lacks a depending projection or ridge so as to be substantially smooth, which construction is not illustrated, the flange is arranged to flatly engage said substantially smooth top wall and this is readily accomplished by increasing the radius of the bend 25.

As has been explained, the head of the rest and its upturned, end lips 23 provide a two-point support for the receiver whereby wobbling or accidental displacement of said receiver is substantially eliminated. Due to the angular relationship between the head and tongue of the rest, said head is disposed at a slight upward inclination to said tongue and to the horizontal when said rest is attached to a telephone instrument. Therefore, the receiver may be, and preferably is, supported by the direct coaction of the head and the sloping rear wall 17 (Figs. 3 and 4). It is pointed out that the rest does not interfere with the normal use of the recess as a hand or finger grip in picking up and carrying the instrument. Also, the provision of the upturned lip 27 as well as its bevel 28 eliminates objectionable sharp edges. Manifestly, the receiver may be readily placed upon and supported by the rest whenever desired without opening the telephone circuit and without creating noise of sufficient amplitude to be transmitted.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A telephone receiver-transmitter rest for attachment to the housing of a telephone instrument having a sloping rear wall with a recess therein, the recess having horizontal top and bottom walls, the rest being substantially T-shaped and including a transverse member for supporting the receiver-transmitter, a resilient clip element for frictional engagement with the top and bottom recess walls, a shank connecting the clip element to one longitudinal margin of the member intermediate its ends, the shank and element extending at substantially a right angle to said member and being of a width less than the width of the recess, said element including a flange overlying said shank in spaced relation and bearing against the top recess wall to hold said shank in flat engagement with the bottom recess wall, said member extending at a slight upward inclination to said shank and having its connected longitudinal margin bearing against the sloping rear wall of the housing whereby said member assists in supporting the receiver-transmitter.

2. A telephone receiver-transmitter rest for attachment to the housing of a telephone instrument having a sloping rear wall with a horizontal recess therein, the recess having horizontal top and bottom walls with a ridge depending from the outer margin of the top wall, the rest being substantially T-shaped and including a transverse member for supporting the receiver-transmitter, a resilient clip element for frictional engagement with the top and bottom recess walls, a shank connecting the clip element to one longitudinal margin of the member intermediate its ends, the shank and element extending at substantially a right angle to said member and being of a width less than the width of the recess, said element including a flange overlying said shank in spaced relation and bearing against the top recess wall to hold said shank in flat engagement with the bottom recess wall, and an upturned lip on the flange conforming to the ridge of the recess, said member extending at a slight upward inclination to said shank and having its connected longitudinal margin bearing against the sloping rear wall of the housing whereby said member assists in sustaining the rest and the rear wall coacts therewith in supporting the receiver-transmitter.

References Cited in the file of this patent

UNITED STATES PATENTS

| | | |
|---|---|---|
| 2,320,838 | Watson | June 1, 1943 |
| 2,608,622 | Von Gunten | Aug. 26, 1952 |
| 2,614,177 | Orms | Oct. 14, 1952 |
| 2,693,509 | Selee | Nov. 2, 1954 |
| 2,705,264 | Gendron | Mar. 29, 1955 |